(12) United States Patent
Zgardovski et al.

(10) Patent No.: US 9,197,750 B2
(45) Date of Patent: *Nov. 24, 2015

(54) METHOD FOR AUTOMATED HANDLING OF OUTBOUND CONTACTS REQUIRING ASSURED CONNECTION TO A LIVE AGENT

(71) Applicant: Genesys Telecommunications Laboratories, Inc., Daly City, CA (US)

(72) Inventors: Stanislav V. Zgardovski, Concord, CA (US); Oleksiy M. Kolomoyskyy, Moraga, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/479,258

(22) Filed: Sep. 5, 2014

(65) Prior Publication Data

US 2014/0376715 A1 Dec. 25, 2014

Related U.S. Application Data

(63) Continuation of application No. 14/055,812, filed on Oct. 16, 2013, which is a continuation of application No. 13/215,982, filed on Aug. 23, 2011, now Pat. No. 8,588,401.

(51) Int. Cl.
*H04M 3/00* (2006.01)
*H04M 5/00* (2006.01)
*H04M 3/51* (2006.01)
*H04M 3/523* (2006.01)

(52) U.S. Cl.
CPC ............ *H04M 3/5158* (2013.01); *H04M 3/523* (2013.01); *H04M 3/5235* (2013.01)

(58) Field of Classification Search
CPC . H04M 3/5158; H04M 3/523; H04M 3/5238; H04M 3/5191; H04M 3/5183
USPC ............ 379/266.08, 265.05, 265.11, 266.07, 379/265.1, 265.01, 266.01
See application file for complete search history.

(56) References Cited

U.S. PATENT DOCUMENTS

| 6,775,378 | B1 * | 8/2004 | Villena et al. ............ 379/266.07 |
| 7,502,460 | B2 | 3/2009 | Rodenbusch et al. |
| 7,899,177 | B1 | 3/2011 | Bruening et al. |
| 2006/0062376 | A1 | 3/2006 | Pickford |
| 2010/0303225 | A1 | 12/2010 | Shashkov et al. |

OTHER PUBLICATIONS

Extended European Search Report dated Jan. 8, 2015 for European Application No. 12826328.2, 7 pages.

* cited by examiner

*Primary Examiner* — Thjuan K Addy
(74) *Attorney, Agent, or Firm* — Christie, Parker & Hale, LLP

(57) ABSTRACT

A system for assuring agent connection for outbound calls placed in an automated outbound calling campaign includes an outbound dialing server, a digital data repository coupled to the outbound dialing server, the data repository storing outbound dialing records for automated outbound dialing, and software executing on the outbound dialing server from a non-transitory physical medium, the software providing a first function for determining for a specific outbound dialing record if the connection to a live agent must be an assured connection, a second function for dialing and engaging an agent via an internal call for reservation of the agent, and a third function for bridging the call connections forged between the system and the agent and the system and the outbound party upon answer of the outbound call.

20 Claims, 3 Drawing Sheets

METHOD FOR AUTOMATED HANDLING OF OUTBOUND CONTACTS REQUIRING ASSURED CONNECTION TO A LIVE AGENT

CROSS-REFERENCE TO RELATED APPLICATIONS

The present application is a continuation of application Ser. No. 14/055,812, filed Oct. 16, 2013, which is a continuation application of Ser. No. 13/215,982, filed on Aug. 23, 2011 now issued as U.S. Pat. No. 8,588,401, the entire content of all of which are incorporated herein by reference.

BACKGROUND OF THE INVENTION

1. Field of the Invention

The present invention is in the field of telephony and pertains particularly to methods and apparatus for automated handling of outbound contacts requiring assured connection to a live agent.

2. Discussion of the State of the Art

In the field of telephony, call centers exist for handling transactions for companies marketing to consumers of products and services. One function available in many call centers is proactive outbound calling of customers for the purpose of engaging those customers in the sales process, hopefully resulting in new transactions.

Outbound dialing campaigns are run inside a contact center in automatic dialing mode. Automatic dialing modes may include progressive dialing mode and predictive dialing mode. Automatic outbound dialing campaigns do not guarantee a connection between the live potential customer and a live agent after the call is answered. In predictive dialing, the system dials more calls than there are available agents to handle the calls based on the assumption that some of those call attempts will not be successfully connected. Therefore, an agent may not appear available for all calls placed.

In progressive dialing mode the system places a call only when it discovers an agent available to take the call. However, the designated agent may become distracted by some other processing tasks and suddenly become unavailable to accept the dialed outbound call. In a blended campaign including incoming calls and outbound calls, incoming calls take priority and may further distract an agent from handling an outbound call in progressive dialing mode.

More recently, is has been observed that some outbound calls made by telephony call centers require an assurance or guarantee that an immediate connection to a live agent is established immediately after the call is answered by a live person. This requirement may be rooted in legislative regulations in specified areas where contact centers conduct business or by business-level requirements for handling specific types of highly valuable customers in outbound campaigns.

A challenge is to implement such 'assured connections' of live persons to agents within the outbound contact center in automatically dialed campaigns without impeding agent productivity. At the time of this writing guaranteed assurance of a live connection for an outbound contact can only be accomplished manually such as in preview dialing mode where an agent that is to handle the call places the call manually after previewing the dialing record. Obvious limitations to this approach include manual dial initiation and manual call progress detection performed by the agent placing the call. It has been shown in empirical testing that manual implementation of outbound contact is significantly less productive that automated dialing.

To automate dialing of contacts requiring assured connection, contact center administration may be required to sort out the dialing records requiring assured connection from standard dialing records and aggregate those into a separate campaign to run at a separate time with a suitable staff of agents for achieving assured connection for those calls answered. Agents working on such specialized campaigns cannot process any other interactions or perform any other tasks causing an impediment to agent productivity.

Therefore, what is clearly needed is a system and methods for automated handling of outbound calls requiring assured connection to a live agent upon answer of the call. A system such as this would enable assured connections without impeding call center productivity.

SUMMARY OF THE INVENTION

The problem stated above is that automated handling of outbound calls that require assured connection to a live agent is desirable for a call center, but many of the conventional means for connecting outbound calls to agents, such as automated progressive and predictive outbound calling campaigns, also create underutilization of agent resources. The inventors therefore considered functional elements of an outbound calling system, looking for elements that exhibit interoperability that could potentially be harnessed to provide custom outbound contact for calls requiring assured connection to a live agent in an automated fashion but in a manner that would not create agent underutilization or require any manual processing.

Every outbound dialing system is driven by a list of machine-readable dialing records, one by-product of which is an unavoidable number of calls that are abandoned due to agent unavailability at the time of the call attempt. Most such outbound dialing systems employ automated dialing programs, servers, and routing routines to conduct the connected outbound calls to available live agents and server-based automated software routines are typically a part of such apparatus.

The present inventors realized in an innovation session that if, at the point of call placement, outbound contacts that require assured connection to a live agent upon answer could be routed to a pre-reserved agent using an automated process, significantly better utilization of the agent's time might result. The inventor therefore constructed a unique outbound calling system that allowed automation in detection of outbound dialing records requiring assured connection and automated treatment of those records, assuring live agent handling immediately upon answer of those outbound calls. A significantly more efficient agent utilization results, with no impediment to the efficiency of normal outbound call processing created.

Accordingly, in one embodiment of the present invention, a system for assuring agent connection for outbound calls placed in an automated outbound calling campaign is provided and includes an outbound dialing server, a digital data repository coupled to the outbound dialing server, the data repository storing outbound dialing records for automated outbound dialing, and software executing on the outbound dialing server from a non-transitory physical medium, the software providing a first function for determining for a specific outbound dialing record if the connection to a live agent must be an assured connection, a second function for dialing and engaging an agent via an internal call for reservation of the agent, and a third function for bridging the call connections forged between the system and the agent and the system and the outbound party upon answer of the outbound call.

In one embodiment, the outbound calling campaign is a predictive campaign or a progressive campaign. In a preferred embodiment, the outbound dialing records requiring assured connection are digitally flagged in nomenclature readable by the software. In a variation of this embodiment, the digital flag is set or not set using binary numbers 1 or 0. In one embodiment, the agent for reservation is selected from the pool of agents working the outbound campaign.

In a preferred embodiment, once the agent is internally engaged, the agent is marked not available for other tasks. In one embodiment, answering the outbound call includes answer by a live person or answer by an answering service. In a variation of this embodiment, the answering service includes an answering machine or answer by a designated third party.

In one embodiment, if the outbound call attempt fails due to busy signal or no answer, the reserved agent is immediately released back into the pool of agents. In one embodiment, a call progress detection feature of the system is automatically switched off for calls requiring assured connection. In one embodiment, the internal call to reserve the agent includes additional data that informs the agent of the assured connection requirement relative to the pending outbound call.

According to an aspect of the present invention, in a system for assuring agent connection for outbound calls placed in an automated outbound calling campaign, a method for rendering dialing records that require assured connection visible to outbound dialing software is provided and includes the steps (a) identifying from a pool of dialing records loaded on an outbound dialing server, individual ones of those dialing records that require assured connection to a live agent upon answer of an outbound call, and (b) digitally flagging the dialing records identified in step (a).

In one aspect of the method, the outbound calling campaign is a predictive campaign or a progressive campaign. In one aspect, in step (b), the flag is set or not set using binary numbers 1 or 0. In one aspect, in step (b) flagging is an automated process based on scripted rules relative to the structure of the dialing records in the pool.

According to another aspect of the present invention, in a system for assuring agent connection for outbound calls placed in an automated outbound calling campaign, a method for reserving an agent for a pending outbound call attempt is provided including steps (a) establishing from the system, an internal call between the system and an available agent, (b) once the call of step (a) is established, placing the outbound call, and (c) when the outbound call is answered, bridging the calls between the system and the agent, and the system and the outbound destination party.

In one aspect of the method, the outbound calling campaign is a predictive campaign or a progressive campaign. In one aspect, in step (a), the internal call to reserve the agent includes additional data that informs the agent of the assured connection requirement relative to the pending outbound call. In one aspect, in step (c) if the outbound call attempt fails due to busy signal or no answer, the reserved agent is immediately released for other duties. In a preferred aspect, in step (c), the call is answered by an answering machine, a designated third party, or by a live person.

BRIEF DESCRIPTION OF THE DRAWING FIGURES

DETAILED DESCRIPTION

The inventors provide a unique system for guaranteeing an assured connection to a live agent for outbound calls placed automatically by an outbound dialing server. The present invention is described in enabling detail using the following examples, which may describe more than one relevant embodiment falling within the scope of the present invention.

Figure 1:
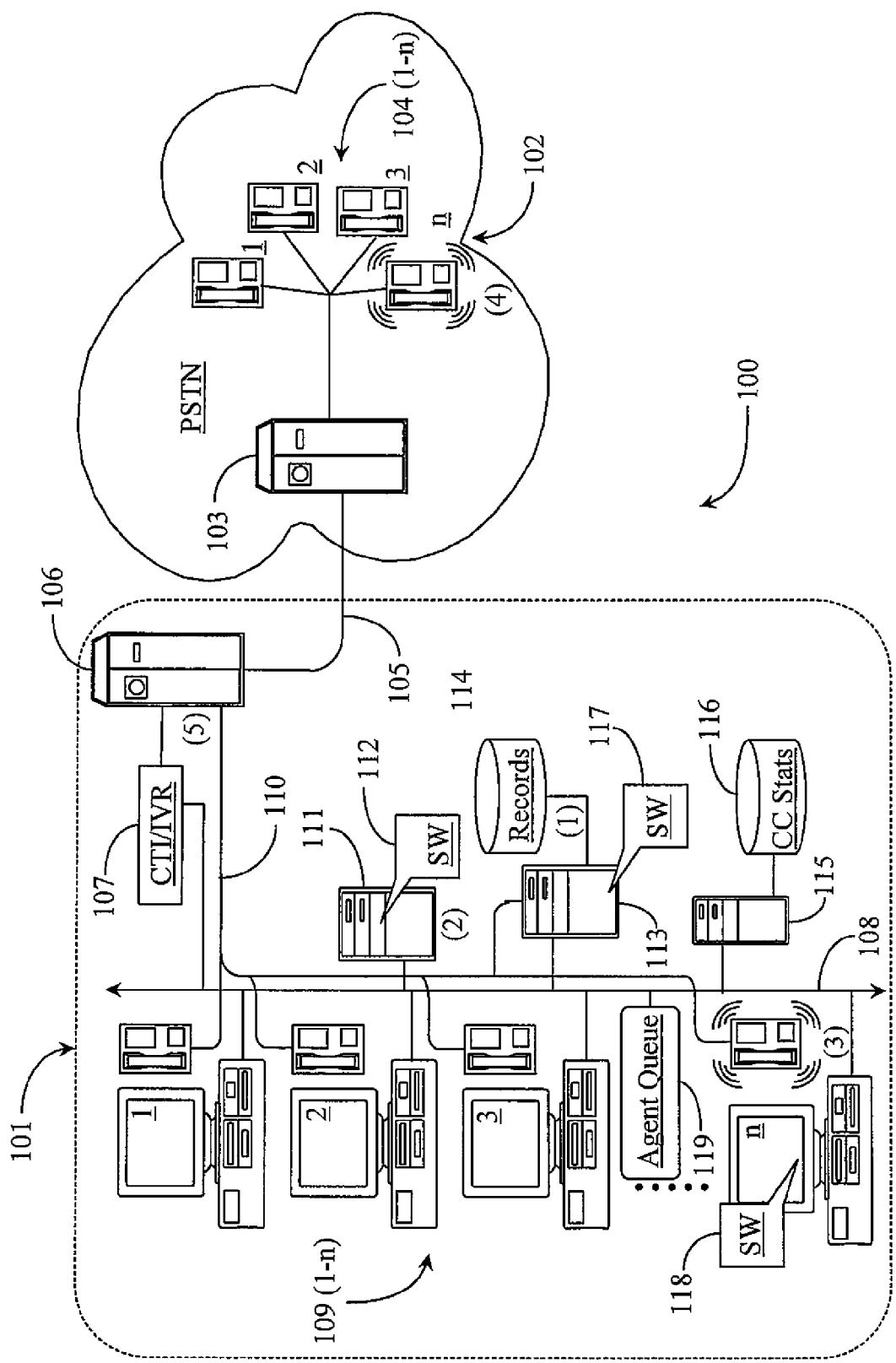
FIG. 1 is an architectural overview of a communications network supporting assured connection of an automated outbound call according to an embodiment of the present invention.

FIG. 1 is an architectural overview of a communications network 100 supporting assured connection of an automated outbound call according to an embodiment of the present invention. Communications network 100 includes a call center 101 having connection to an external telephone network 102, which is the public switched telephone network (PSTN) in this example. PSTN 102 may also carry telephone communications sourced from wireless carriers and other types of telephone and data networks without departing from the spirit and scope of the present invention.

PSTN network 102 includes a local telephone switch 103. Telephone switch 103 may receive calls, which are destined for call center 101, sourced from any telephony-capable appliance. Telephone switch 103 may be a private branch exchange (PBX), an automated call distributor (ACD), or another type of telephone switch including a soft telephony switch (data networks) without departing from the spirit and scope of the present invention. Telephone switch 103 is connected via a telephone trunk 105 to a central telephone switch 106 maintained within call center 101. Telephone switch 106 may be a PBX, an ACD, or another type of telephone switch including a soft telephony switch (data networks) without departing from the spirit and scope of the present invention.

Call center 101 is adapted to perform customer service including transaction fulfillment for one or more client companies. However the present invention is not limited to being practiced from a specific architecture symbolized by a call center. In one embodiment, the invention may be practiced in a virtual call center environment using an outbound dialing server and an accessible pool of live call center agents that may be grouped or distributed remotely over a wide area network.

Call center 101 includes a local area network (LAN) 108 adapted for data communications and Internet protocol (IP)-based telephony. An Internet network connection to call center 101 is not illustrated in this example, as illustration of one external communications network is deemed sufficient for explanation of the present invention. LAN 108 supports a computer telephony integrated (CTI) processor 107 directly connected thereto and connected via a CTI link to telephone switch 106. CTI processor 107 is adapted to provide call routing intelligence among other things to telephony switch 106. CTI processor 107 includes an instance of interactive voice response (IVR) software adapted to screen incoming calls into the center for the purpose of determining caller intent and self-service options for some callers who do not require live assistance.

LAN 108 supports a number of agent-operated workstations 109 (1–n). Agent workstations 109 (1–n) each include, at minimum, a LAN-connected personal computer (PC) and a telephone for voice communication. In this example telephones deployed at each workstation 109 (1–n) is connected to telephone switch 106 via internal telephone wiring 110. Other configurations are common including headsets that operate with telephone applications on the PCs, IP telephones directly connected to LAN, and other possible configurations. Agent workstations 109 (1–n) may be considered a pool of active call center agents in this example. As such, the agents share an agent queue 119. Agent queue 119 is adapted to contain interactions waiting for service by live agents. Statistical parameters tied to queue 119 include estimated waiting time, abandonment rate and like statistics.

LAN 108 supports an outbound dialing server 113. Outbound dialing server 113 includes a non-transitory physical storage medium adapted to contain all of the data and software required to enable function as an outbound dialing server. Outbound dialing server 113 is connected to a data repository 114 that is adapted to contain dialing records for an outbound campaign presumed running in this example. Dialing records 114 contain information about customers and at minimum, the primary customer contact number for outbound dialing. Outbound dialing server 113 is adapted with the aid of a SW application 117 to place outbound calls from a list of dialing records. Records in repository 114 contain both those that require an assured connection to a live agent upon answer, and those that do not require an assured connection. In this example, outbound calls are queued along with normal incoming traffic in queue 119.

An outbound campaign presumed running in this example might be a predictive style campaign or a progressive style campaign. In predictive dialing mode, server 113 places outbound calls for agents who are predicted to be available at the time of answer of the call. In progressive mode, a call is placed each time an agent is determined to be available. In each mode, the system places one or more additional calls based on the assumption that some call attempts will fail due to busy or no answer. This is done to optimize agent utilization as much as possible. Both modes described above are automated and driven by algorithm.

LAN 108 supports a universal routing server 111. Routing server 111 includes a non-transitory physical digital medium adapted to contain all of the data and software required to enable service of routing instructions upon request. Routing server 111 is adapted to provide intelligent routing routines for routing interactions to agents 109 (1–n). LAN 108 supports a statistics server 115. Statistics server 115 includes a non-transitory physical medium adapted to contain all of the data and software required to enable function as a statistics server. Statistics server 115 is connected to a data repository 116 that contains call center statistics for service.

Agent queue 119 may have several statistics associated with it such as current estimated waiting time in queue. Agents operating workstations 109 (1–n) have statistics associated with them such as current availability status, average call handling time, and other types of statistics. Outbound dialing server 113 may subscribe to statistical server 115 for statistics related to agent availability. Routing server 111 may also subscribe to current statistics available from statistics server 115.

Customers and potential customers of call center 101 are represented herein as telephone icons (104 (1–n) (logically illustrated). In some jurisdictions, outbound calls placed to certain numbers require that if answered, the customer is connected to a live agent immediately without requiring a typical wait in queue. These dialing records in repository 114 may have a binary flag set as 1 or 0 where 1 indicates that this record requires assured connection to a live agent and 0 indicates that this record has no requirement for assured connection to a live agent.

In practice of the invention, outbound dialing server 113 first selects a next record in a list of records organized in repository 114 (1). The outbound dialing server reads the record looking for a set flag indicating that an assured connection is required. If an assured connection is required, an outbound call placement is delayed until it is determined if there is an available agent, which may be determined at routing server 111 (2). Once it is determined that an agent is physically available to handle the call, the outbound dialing server places an internal call to the target agent, in this case 109 (n) (3). This action effectively "reserves" the agent for handling the call. The agent cannot receive any other calls or perform any other tasks while "engaged" by the system.

Desktop software 118 installed at the agent's PC in the workstation notifies the agent via message, pop-up, beep, or tone that the agent is being reserved specifically for the pending outbound call. Agent workstation 109 (n) receives all of the information about the customer subject to the outbound call placement before or at the time of call placement with the aid of a desktop notification SW 118.

The system then places an outbound call to the number on the dialing record and waits for an answer (4). In this case customer 104 (n) answers the call from the outbound dialing server. Outbound dialing server 113, with the aid of SW 117 and CTI processor 107, bridges the separate calls (internal to agent) and (outbound to customer) once the customer has answered the outbound call establishing a session between the agent and the customer. Other agents working agent queue 119 proceed normally as outbound dialing server 113 places outbound calls. The reserved agent 109 (n) in this example is immediately released if call progress detection does not detect a live answer, answering service, or an answering machine. In one embodiment, call progress detection may be disabled for outbound calls that require assured connection.

Figure 2:
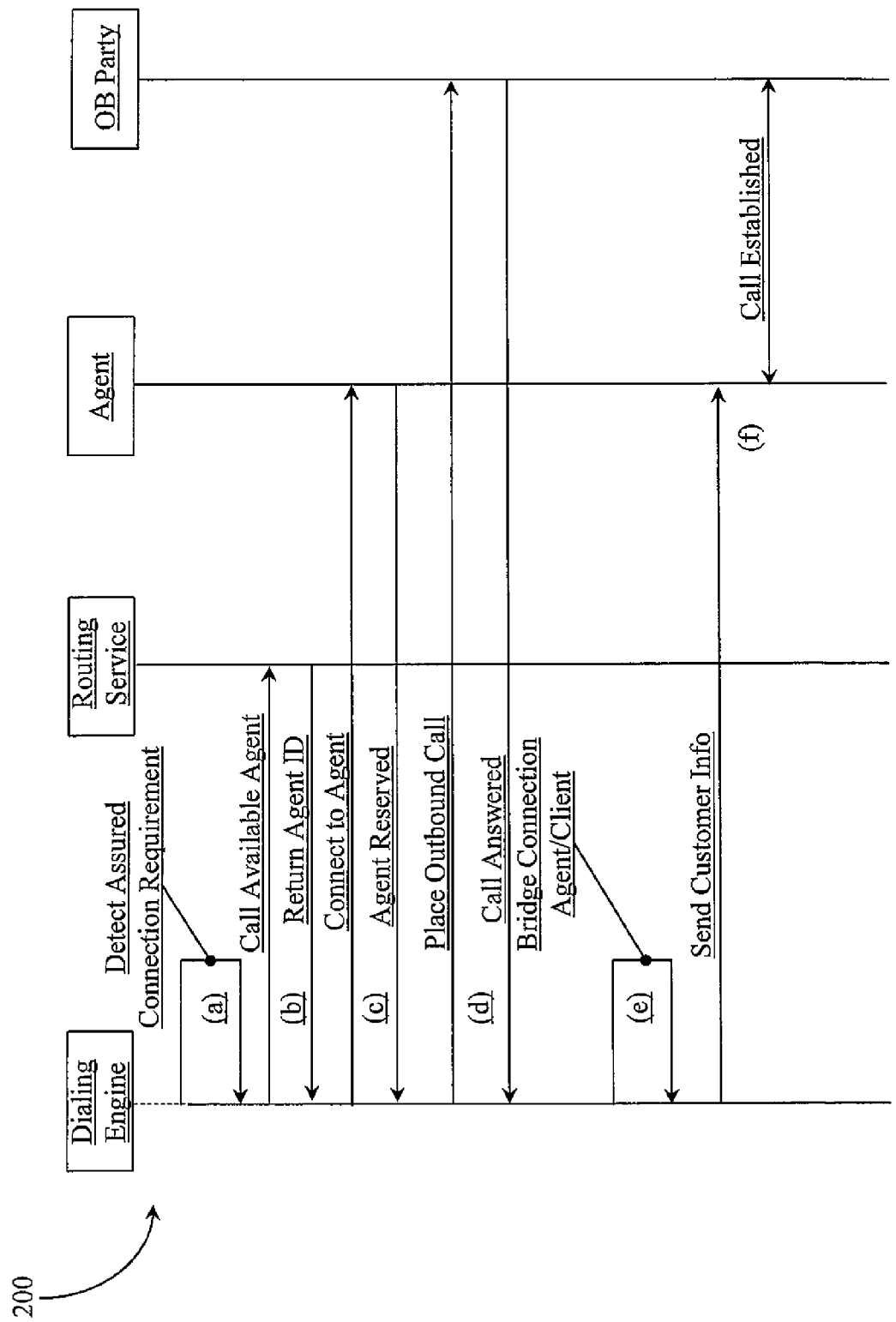
FIG. 2 is a united markup language sequence diagram illustrating a sequence of events for establishing assured connection of an automated outbound call according to the embodiment of FIG. 1.

FIG. 2 is a united modeling language (UML) sequence diagram 200 illustrating a sequence of events for establishing assured connection of an automated outbound call according to the embodiment of FIG. 1. Diagram 200 includes a dialing engine analogous to SW 112 residing on outbound dialing server 113 of FIG. 1. At (a), the dialing engine detects a dialing record that requires an assured connection to a live agent upon answer of an outbound call. At (b), the dialing engine checks with a routing service analogous to SW 112 residing on routing server 111 of FIG. 1. if there is an available agent to handle the call. The routing service returns the number for the available agent. Real time agent availability statistics may be used to determine agent availability.

At (c), the dialing engine places an internal call to the agent to reserve the agent for the pending outbound call. Desktop notification SW analogous to SW 118 of FIG. 1 may inform the agent of the reservation status. At (d), the outbound dialing engine places the outbound call to the outbound party according to dialing parameters of the dialing record. Once the call is answered, at (e), the dialing engine bridges the separate calls to establish the session between the agent and the outbound party. The customer information pertinent to the dialing record and purpose of the session is forwarded to the agent with the aid of desktop notification software as described previously. This step may be performed at the time of call placement or call bridging such that the information is available to the agent before the session begins. At (f), the session is established.

In one embodiment, dialing records requiring assured connection are dispersed throughout the dialing record in a manner that prevents them from being stacked together requiring an unreasonable number of agents to be reserved. The dialing engine may recognize records as requiring an assured connection via flagging the state using a binary flagging system. Other forms of tagging may also be used. In one embodiment reserving an agent by internal call may result through a prediction of agent availability, the internal call placed according to a prediction of the next available agent. The outbound call is not placed until the reserved agent is physically engaged in a call assuring reservation.

Figure 3:
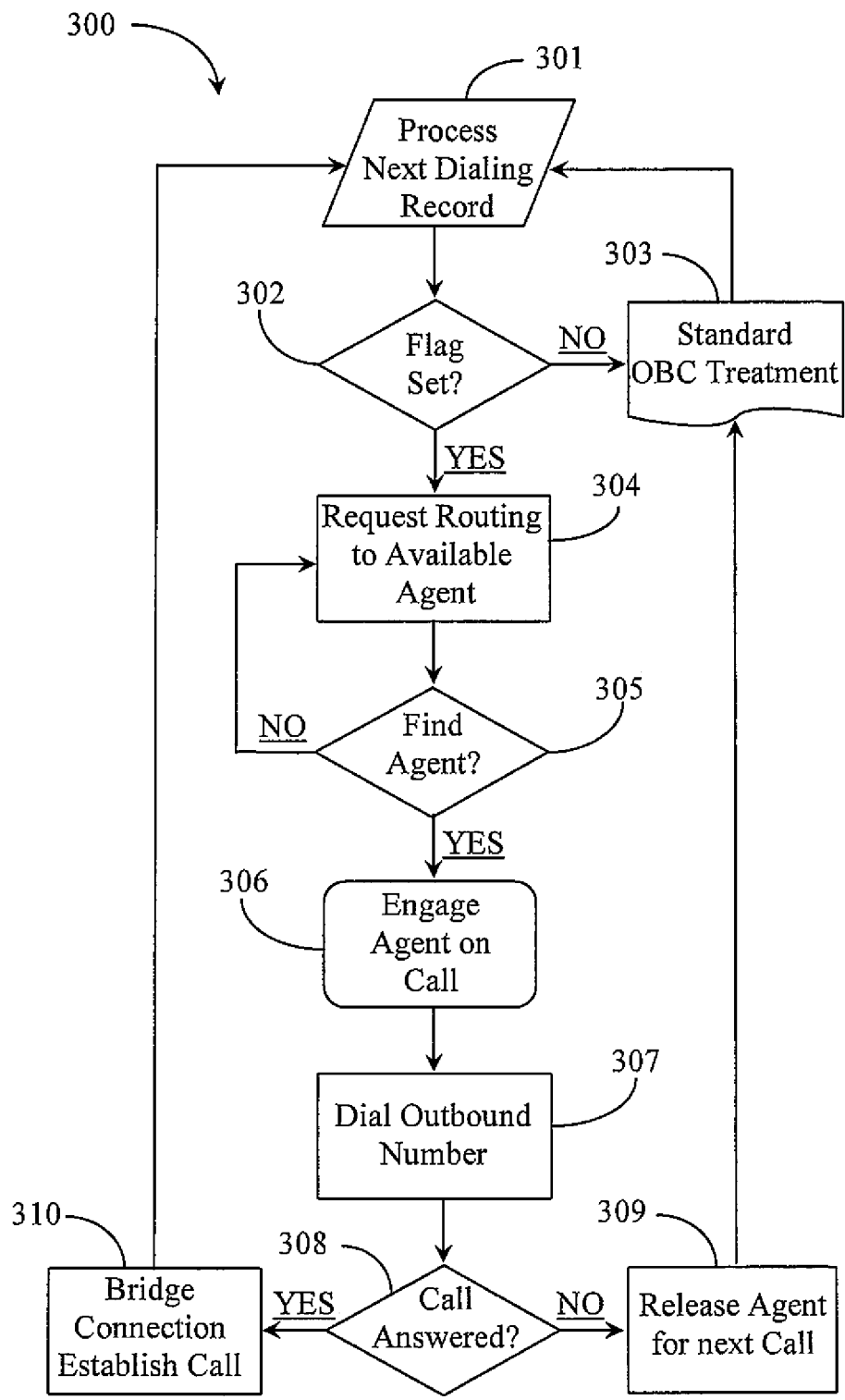
FIG. 3 is a process flow chart illustrating steps for assuring connection of an automated outbound call according to an embodiment of the present invention.

FIG. 3 is a process flow chart 300 illustrating steps for assuring connection of an automated outbound call according to an embodiment of the present invention. At step 301 an outbound dialing server analogous to server 113 of FIG. 1 processes a next dialing record from a list of records assembled for an outbound calling campaign. At step 302, the server determines if the flag is set for assured connection to a live agent. If at step 302, the engine determines that the flag is not set, the process moves to step 303 where standard outbound calling treatment is performed for the record. This may include queuing the call, if answered for the next available live agent.

At step 302, if it is determined that the flag is set, the dialing engine requests routing to an available agent at step 304. At step 305, the routing service determines if an agent is available. If an available agent is not found (all agents busy), the dialing engine may repeat the request until the service returns an available agent ID. If the service finds an available agent at step 305, the dialing engine calls the agent at step 306 and engages the agent in reserved session pending the outcome of the outbound call placement.

At step 307, the dialing engine places the outbound call according to the parameters of the dialing record. At step 308, the dialing engine determines whether the outbound call is answered. If at step 308, the placed call to the outbound party is not answered, the agent on reservation is released for the next normal call at step 309. After call failure and release of agent, logic may be provided for post treatment of the dialing record such as repeating the call attempt at a later time during the campaign window. The process resolves back to step 301 where the dialing engine selects a next record for processing. It is important to note that other dialing records not requiring assured connections might be pulled and processed normally while the dialing record requiring assured connection is processed according to the present invention. In this way, delaying placement of the outbound call until an agent reservation is conserved may not impede on the other calls being serviced.

If the dialing engine detects that the call is answered at step 308, the dialing engine immediately bridges the two separate calls to establish the session between the client and the agent. In this case, the outbound party did not require any time in queue. After the session is established at step 310, the process resolves back to step 301 where processing of dialing records is ongoing. In one embodiment, dialing records may be tagged or flagged by an automated software-driven process using a rules base that instructs the software which particular records to flag for assured connection. Such rules may be updated as designations for assured connection are changed or added for specific calling areas or regions.

As mentioned above, dialing records may be tagged or flagged to indicate that an assured connection is required. In accordance with the present invention, however, this indication is not necessarily static, but in some cases may be changed just before or during execution of the outbound campaign. This may be advantageous, for example, where a certain quota of assured-connection calls has or has not been met. In some embodiments the condition of a dialing record or group of records as flagged or not flagged may be altered. This may be done manually by an operator while the campaign is in progress, for example, or initiated by software in response to a threshold or trigger set manually or by rule. There are, as well, a variety of ways that such tags may be applied, and in some cases the tag itself may be of sufficient complexity to initiate any one of or combination of a variety of actions to operate on a particular dialing record.

In another embodiment of the invention, in an outbound campaign, functionality is provided to track instances wherein a live party answers a call, but no successful connection is made to a live agent. In some circumstances in is highly desirable under such circumstances to re-dial the party that answered the call, and to make certain, in the circumstance that the called is again answered by a live person, that the person be immediately connected to a live agent. This is accomplished in this embodiment by inserting the number back into the dialing list with the flag set for an assured connection, so when the number is redialed, in the event the call is answered, there will be an agent waiting to communicate with the person called.

It will be apparent to one with skill in the art that the outbound dialing system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

What is claimed is:

1. A system for routing an outbound communication comprising:
   a repository configured to store a plurality of numbers for an outbound campaign;
   processor; and
   memory, wherein the memory stores instructions that, when executed by the processor, cause the processor to:
      identify a particular number of the plurality of numbers for an outbound communication during the outbound campaign;
      determine whether the identified number is flagged as requiring connection with a live agent;
      in response to determining that the identified number is flagged as requiring connection with the live agent, identify an available agent to handle the outbound communication;
      reserve the identified available agent;
      in response to successfully reserving the identified available agent, initiate the outbound communication to the identified number; and
      in response to the live person answering the outbound communication, establish a communication session between the reserved agent and the live person.

2. The system of claim 1, wherein the instructions further cause the processor to:
   identify a second number of the plurality of outbound numbers for a second outbound communication during the outbound campaign;
   initiate a second outbound communication to the second number; and
   in response to a second live person associated with the second number answering the second outbound communication, queue the second outbound communication for later routing to a second available agent.

3. The system of claim 2, wherein the second number is not flagged as requiring connection with a live agent.

4. The system of claim 1, wherein the outbound communication is a telephony communication.

5. The system of claim 1, wherein the available agent is reserved for handling the outbound communication before initiating the outbound communication to the identified number.

6. The system of claim 1, wherein the identified number is associated with a geographic location having laws relating to live assistance.

7. The system of claim 1, wherein the instructions further cause the processor to convert a second one of the plurality of the numbers to a second number, wherein the second number is flagged as requiring connection with a live agent.

8. The system of claim 1, wherein the instructions further cause the processor to place an internal call to the available agent for reserving the available agent for handling the outbound communication.

9. The system of claim 8, wherein the instructions further cause the processor to bridge the internal call and the outbound communication for establishing the communication session between the available agent and the live person.

10. The system of claim 1, wherein the instructions further cause the processor to release the available agent in response to detecting that the live person has failed to answer the outbound communication.

11. The system of claim 9, wherein the program instructions cause the processor to reserve another agent after a period of time has elapsed without establishing the communication session with the live person.

12. A method for routing an outbound communication comprising:
identifying, by a processor, a particular number of a plurality of numbers stored in a repository, for an outbound communication during an outbound campaign;
determining, by the processor, whether the identified number is flagged as requiring connection with a live agent;
in response to determining that the identified number is flagged as requiring connection with the live agent, identifying, by the processor, an available agent to handle the outbound communication;
reserving, by the processor, the identified available agent;
in response to successfully reserving the identified available agent, initiating, by the processor, the outbound communication to the identified number; and
in response to the live person answering the outbound communication, establishing, by the processor, a communication session between the reserved agent and the live person.

13. The method of claim 12 further comprising:
identifying, by the processor, a second number of the plurality of outbound numbers for a second outbound communication during the outbound campaign;
initiating, by the processor, a second outbound communication to the second number; and
in response to a second live person associated with the second number answering the second outbound communication, queuing, by the processor, the second outbound communication for later routing to a second available agent.

14. The method of claim 13, wherein the second number is not flagged as requiring connection with a live agent.

15. The method of claim 12, wherein the outbound communication is a telephony communication.

16. The method of claim 12, wherein the available agent is reserved for handling the outbound communication before initiating the outbound communication to the identified number.

17. The method of claim 12, wherein the identified number is associated with a geographic location having laws relating to live assistance.

18. The method of claim 12 further comprising:
converting, by the processor, a second one of the plurality of the numbers to a second number, wherein the second number is flagged as requiring connection with a live agent.

19. The method of claim 12 further comprising:
placing, by the processor, an internal call to the available agent for reserving the available agent for handling the outbound communication.

20. The method of claim 12 further comprising:
bridging the internal call and the outbound communication for establishing the communication session between the available agent and the live person.

* * * * *